June 28, 1966　　　　　H. TOPLARSKI　　　　　3,257,928
VENTILATING DEVICE FOR AUTOMOBILES
Filed April 20, 1964　　　　　　　　　　　　　2 Sheets-Sheet 1
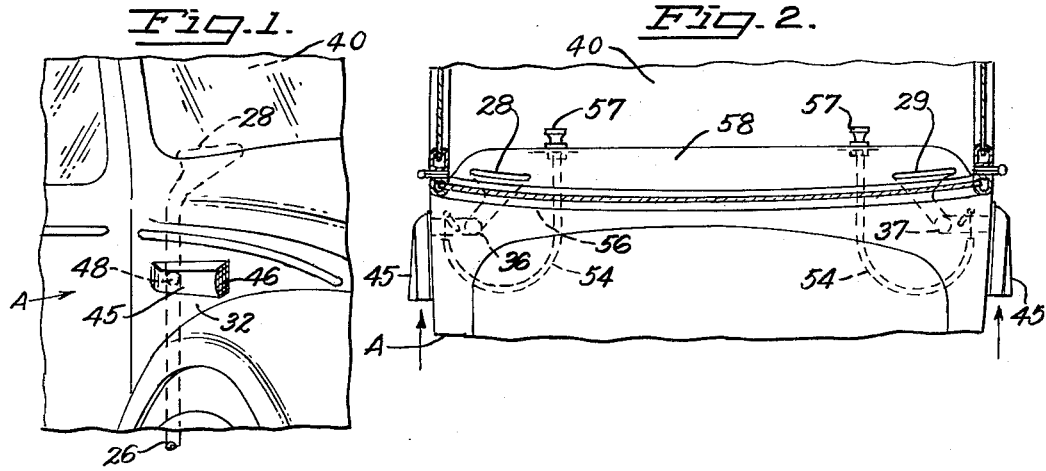
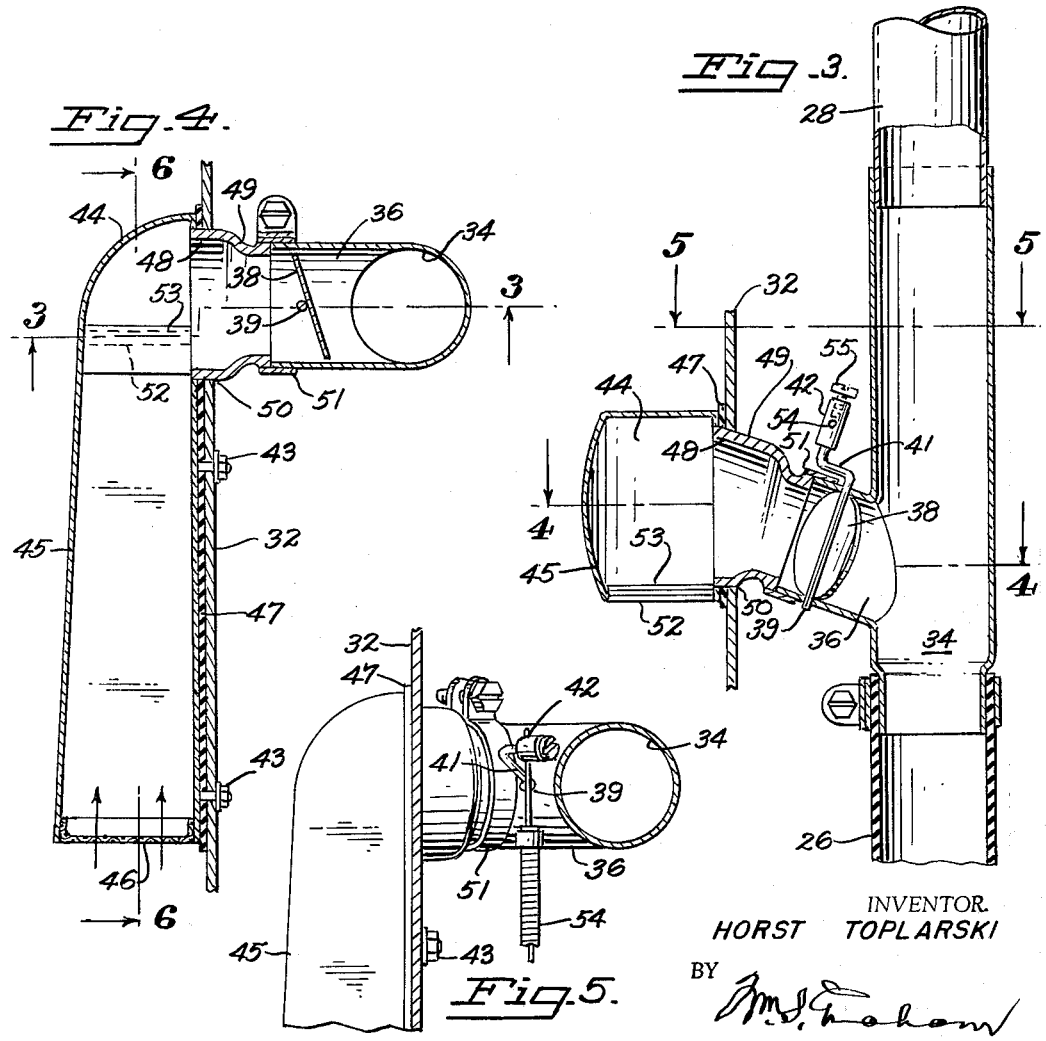
INVENTOR.
HORST TOPLARSKI
BY
ATTORNEY

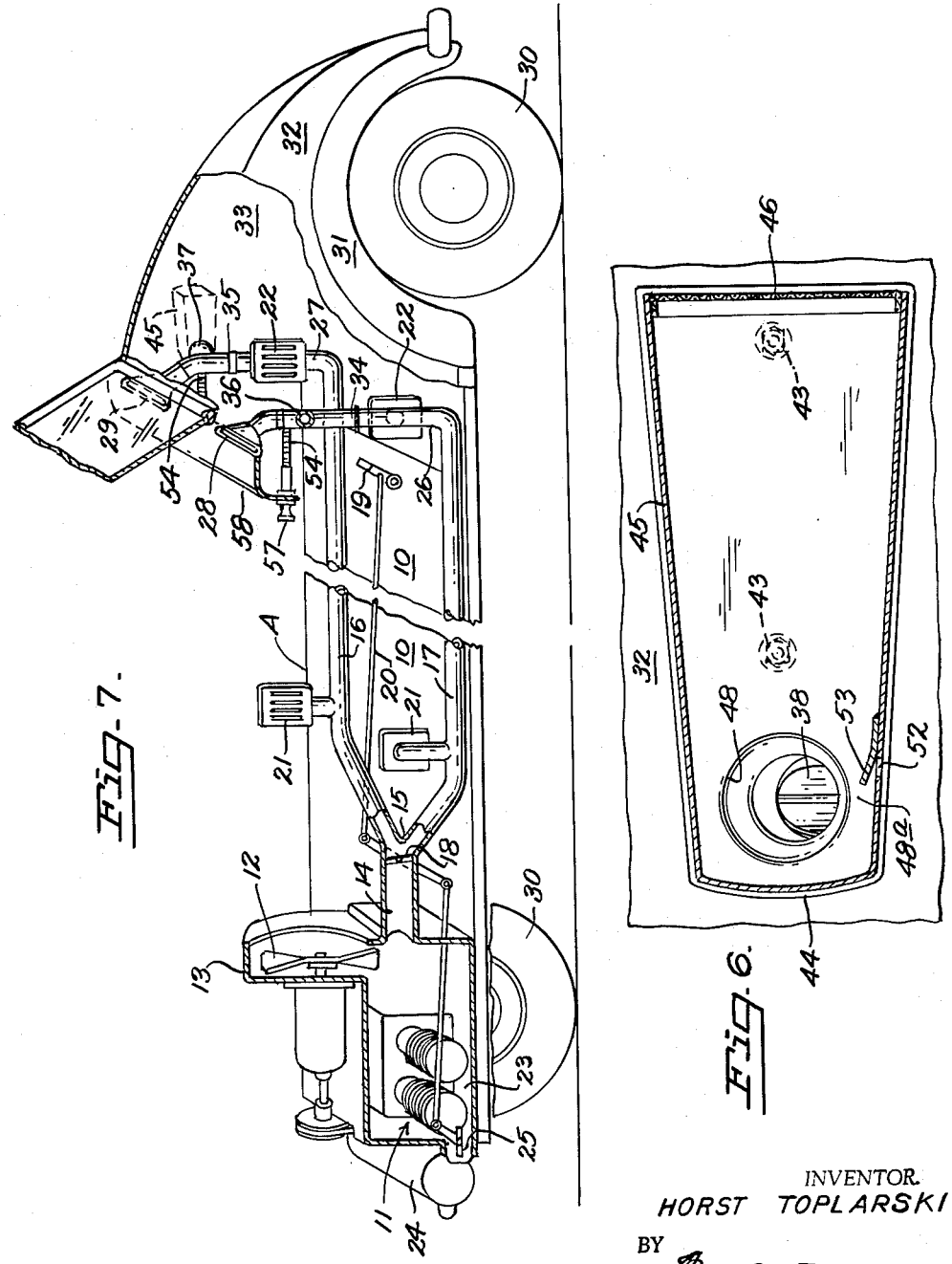

United States Patent Office 3,257,928
Patented June 28, 1966

3,257,928
VENTILATING DEVICES FOR AUTOMOBILES
Horst Topiarski, 307 Guerrero St.,
San Francisco, Calif. 94110
Filed Apr. 20, 1964, Ser. No. 361,182
10 Claims. (Cl. 98—2)

This invention relates to ventilating devices for automobiles or motor cars. More particularly the invention relates to such ventilating devices which bring air into the closed passenger compartment of a motor car without opening the windows of such compartment. Many types of motor cars do not have adequate facilities for ventilation of closed passenger compartments without opening windows, more particularly, in such motor cars which have passengager compartments relatively small in structure, such as in several types of automobiles manufactured in foreign countries, and also in some automobiles presently manufactured in the United States, which are commonly referred to as compact models.

Obviously such a closed body of a motor car may be ventilated by opening a window, and the present invention does not negate employment of such open-window ventilation. But there are various apparent disadvantages to such ventilation, in that when the weather is inclement it is drafty and cold to passengers who may be directly in the line of the incoming air current, and even in warm weather it is disagreeable to passengers who may be directly in the line of the air flow, since if it is hot air it may be disagreeably warm and dry and harsh to the skin, as well as disarranging the hair, a very potent factor to feminine passeners in all motor car transportation for social purposes.

It is an object of this invention to provide an economical ventilating means for closed passenger compartments of automobiles; to provide such a ventilating means which may operate independently, or cooperate with a heating means selectively to provide fresh cool or warm air for ventilation; to provide a ventilating means in an automobile which has limited space for introduction of ventilating accessories; to provide in an automobile a ventilating means simple in structure and operation and which may be readily installed with minimum of alteration of existing body structure of the car.

With the foregoing and other objects in view, which will be more apparent from the specification herein, one form in which the invention may be embodied is described in the accompanying specification and illustrated in the appended drawings in which:

FIG. 1 is a fragmentary perspective view of vehicle showing location of invention, relative to car body;

FIG. 2 is a fragmentary plan view of a portion of car body showing detail of controls;

FIG. 3 is a fragmentary vertical section on line 3—3 of FIG. 4.

FIG. 4 is a fragmentary horizontal section on line 4—4 of FIG. 3.

FIG. 5 is a fragmentary horizontal section on line 5—5 of FIG. 3.

FIG. 6 is a longituidnal sectional view on line 6—6 of FIG. 4.

FIG. 7 is a diagrammatic perspective view of automobile car chassis, showing a heating system in connection with which the invention may be combined.

Referring to the drawings in which like reference characters indicate corresponding parts in the several views, A indicates generally an automobile car body of a type which has a chassis 10 which may be formed as an integral planar sheet of metal, and has an engine or motor generally indicated 11 positioned at the rear end of the chassis of the car, though the invention may equally well be adapted to motor cars having the engine or motor at the forward end of the chassis. Any suitable system may be provided for utilizing heat radiated by the engine for warming the passenger compartment of the vehicle and in the present exemplification such heating system is schematically disclosed as including a fan 12 suitably rotated within a fan casing 13 by motor 11, and propelling or fanning a volume of warm air through a communicating conduit 14. Spaced from the fan casing the conduit 14 may be bifurcated as at 15, whereby there is a heat conduit extending from the conduit 14 to each side of the driver and passenger compartment 40 of the vehicle, preferably substantially at the floor level, as indicated 16, 17. The conduits 16, 17, may, if desired, be formed integrally as a part of the planar sheet of the chassis. Any type of cutoff valve 18 may be installed at the bifurcated juncture of the conduits 16, 17, the valve being operable from the driver's compartment by a suitable handle and lever 19 and connecting rod 20 so that flow of the heat may be cut off from conduits 16, 17, when not needed, such as in the warm weather of summertime. Relatively small outlets 21 and 22 may be provided in the conduits 16, 17 providing vent openings forwardly and rearwardly at floor level on opposite sides of the passengager compartment of the vehicle for providing warmth at the foot level of the passengager compartment.

A by-pass opening 23 may also communicate with the fan casing and air conduit 14 in close proximity to the motor so that when the valve 18 is closed, the fanned air may pass out through the by-pass opening and discharge to atmosphere through muffler 24, a valve 25 being simultaneously oppositely operated by lever 19 and rod 20 relative to the valve 18, the valve 25 serving to open the by-pass when the valve 18 is closed, and close the by-pass opening when the valve 18 is open.

It is to be noted that each of the air conduits 16, 17 is angled upwardly from the floor level at its forward end by means of conduits 26, 27 which are flexible tubes in the preferred form of the invention. Prior to installation of the present invention the upper end of these conduits 26, 27 terminate in communication with tubular portions of defrosting opening vents 28, 29 at the lower portion of the opposite transverse ends of the windshield, and being within the driver and passenger compartment of the vehicle.

As is conventional, the vehicle has wheels 30, fenders 31 thereover, and a hood 32 overlying a front compartment 33 of the vehicle body, the latter compartment being empty, and providing a storage space or so-called trunk if the engine is at the rear.

It is the environment of the upward conduits 26, 27, and defroster openings 28, 29 together with the hood 32 and front storage or trunk compartment 33, in which the novel structure of the present invention is mounted.

Intermediate the ends of each of the upwardly positioned conduits 26, 27, that is, adjacent the side wall at each of the opposite sides and within the front compartment 33 and in adjacent communication with the defroster outlets 28, 29, there is mounted an insert ventilating tube separately indicated 34 and 35, each of which tubes has axially aligned communicating connection at one of its ends with one of the heating conduits 26, 27, and having the opposite end thereof leading to and communicating with a correspondingly tubular portion of one of the defroster openings 28, 29. Intermediate its opposite ends each of the ventilating tubes 34, 35 is provided with a branch tubular valve chamber or valve-regulated air inlet indicated 36, 37, angularly inclined upwardly from the tubes 34, 35. Within each of these branched air inlets is a suitable valve for control of air flow therethrough, exemplified as a simple well-known pivoted plate or butterfly plate valve 38 pivoting at its central diameter on pivot pin 39 for selectively opening and closing the respective air inlets 36, 37. The plate valves 38 may be turned on the diametral pin 39 by means of an extension which passes through the wall of the air inlet member and has a crank or leverage bend 41 and a knob 42 to which any suitable valve-operating means may be attached, such as a Bowden wire designated 54 to be further described.

An air intake funnel 45 is provided in close superficial contact at the exterior of each side wall of the hood 32 to which it is secured by bolts 43. The funnels 45 are preferably elongated and having four walls arranged generally rectangular in lateral transverse section, as shown in FIG. 3, said walls being tapered and providing a larger open end forwardly, and closed at a rearward end by an arcuately inturned wall 44. Thus, the funnel members 45 are generally wedge-shaped longitudinally as best shown in FIGS. 4 and 6. The forward open end of each funnel is preferably provided with a screen 46. The funnels may be conveniently mounted so that the rearward ends thereof are positioned a relatively short distance from the entry door of the driver's compartment. And if the body of the car has a curved fender over the front wheel, the forward end of the funnel may be rearwardly of the maximum height of such fender. In the absence of such a fender, the funnel members may be positioned alongside, and in contact with, the car body at a suitably convenient location so that the rear end of the funnel will be free of the entry door as well as convenient to the instrument panel 58, the defroster openings 28, 29, and the warm air conduits 26, 27.

Preferably there is a buffer sheet 47 of soft material such as rubber between each funnel member and the wall of the car hood.

The inner side wall of each of said funnel members which are next adjacent the respective side walls of the car hood have at the rearward end portion a preferably circular opening 48, to the edge of which is secured the annular edge of a downwardly inclined connecting tubular nipple 49, said connecting nipple of each funnel passing through a correspondingly circular opening 50 in each of the opposite side walls of the hood of the car body, the opening at the opposite end of said nipple being securely connected by a band clamp 51 in communication with the upwardly inclined valve-controlled branch conduit 36. The lower edge portion of the opening 48 is spaced a short distance, such as ¼ inch from the lower wall of the funnel as indicated 48a.

It is to be noted that means are provided for disposing of moisture in the funnel such as may accumulate from driving in rain or snow. Such moisture as may accumulate in the forward portion of the funnel will normally drain out due to the incline of the forward end portion of the lower funnel wall. Any moisture which may penetrate to the rear portion of the funnel will not turn the angle at the rear end of the funnel leading to the control valve, but will drop to the floor at the rear end of the funnel and will be prevented from flowing through opening 48 due to the spacing of that opening from the lower wall as at 48a. Such moisture may drain out of an open transverse slot or drain vent 52 which is provided in the lower wall of the funnel adjacently spaced from the rear end wall. If desired, a transverse baffle hood 53 may overlie the slot 52 in spaced relation so as to direct any moisture out of said slot.

Suitable means may be provided for opening and closing each of the valves 38 from the interior of the driver's compartment 40 of the car, which, being similar, only one is described. As stated, the valve 38 may be rotated on its pin 39 to selectively open and close the branch conduit 36, thereby selectively opening wholly or partially, or effectively limiting or cutting off the intake of air from the funnel 45, such as might be advisable in accordance with temperature of the weather. Such means may be exemplified by a Bowden wire 54, one end of which may be attached to the knob 42 of crank 41 and secured thereto by screw 55, said wire extending, preferably by an arcuate bend, to and through the cowl board 56 in the front portion of the driver's compartment, where it is provided at its terminal inner end with a manually operable push-pull handle knob 57 which is easily accessible for manual manipulation by the vehicle driver for selectively partially or wholly opening and closing the valve 38. For convenience and to provide protection for the manually operated inner end of the Bowden wire, such manually operable inner end may, if desired, be shielded by positioning it close to the instrument panel board 58 as best shown in FIG. 2. Manifestly, the separate ventilator devices of the invention at opposite sides of the vehicle may be operated singly or simultaneously for respectively opening and/or closing the ventilating conduits.

In operation, in cold weather the valve 18 is maintained open by lever and rod 19, 20, and the heated air may be fanned through the conduits 16, 17 to the passenger compartment through outlets 21, 22 and to defroster outlets 28, 29. If some external ventilation by intake of air is also desired, in cold weather, the ventilation system may be operated to the extent desired by manipulation of either or both of the Bowden wire knobs 57 to selectively open or close the valves 38 to any desired extent. In warm weather the valve 18 may be closed to completely cut off the flow of fan-warmed air in which event the fan-warmed air will be discharged through a vent 23, whereupon the ventilating system as described may be separately operated in the manner described by manipulation of one or both of the knobs 57 and the corresponding valves 38. For operation of the valves 38, the Bowden wire is preferred, both for its convenience and economy, and also its adaptability to curvature of the wire within its casing which serves as a frictional brake by contact of the wire against the casing to maintain the valve plate at the position at which it is pre-set.

The downward incline of the nipple 49 and the upwardly angled valve chamber of the branch 36, taken together provide a valve-controlled downwardly inclined inlet for air from the funnel 45 which dissipates the velocity and force of the incoming air at relatively high vehicle speeds, and facilitates distribution of the incoming air when the valve 18 in the heating conduits is closed whereby portions of intaken air may pass through the conduits 16, 17 for discharge or distribution from the floor outlets 21, 22, and a relatively smaller volume may be distributed through the defroster openings 28, 29.

Since simplicity of structure of the ventilating device and the installation thereof in an automobile is an object of the invention, it is to be noted that for such installation it is necessary to cut one hole only in the body for each ventilator funnel, as indicated at 50 and install one of the tubular conduit members 34, 35 intervening between each of the upwardly turned conduits 26, 27 and the defroster openings 28, 29.

Having described the invention, I claim:

1. In an automobile having a heating system including a heating conduit means whereby heat from the motor may be conducted to the passenger compartment of the vehicle and to at least one defroster outlet adjacent a windshield of the vehicle, said conduit in said heating system including a tubular conduit portion extending from approximately the floor level to communicate with said defroster outlet, the combination therewith of ventilating means comprising an air funnel mounted in close superficial contact with the exterior of the automobile body, the side wall of the funnel next adjacent to the automobile body having an opening adapted for communication with a suitable opening in the side wall of said automobile body, a valve controlled tubular conduit communicating between said last mentioned funnel opening and the conduit to the defroster outlet, a control valve in said last mentioned conduit, and means for operatively controlling said last mentioned valve from within the driver compartment of the automobile.

2. The combination as set forth in claim 1 and in which the said valve controlled tubular conduit is downwardly inclined.

3. In ventilating apparatus for automobiles, the combination as set forth in claim 1, the means for controlling the valve being a Bowden wire having an arcuate bend in its length.

4. In automobile ventilating apparatus, the combination as set forth in claim 1 and in which the heating conduit means is controlled by a valve means whereby heat from the motor may be directed selectively into the passenger compartment or discharged to the atmosphere.

5. In an automobile which has a windshield and a hood enclosing a compartment at the forward end portion of the automobile forwardly of the windshield, said hood having an opening in its side wall for receiving therethrough a tubular valve conduit and an air conduit in a defroster system having a defroster outlet adjacent the lower portion of the windshield, the combination therewith of a ventilating means including an air funnel mountable in close superficial contact on the exterior of said hood wall, the rear end portion of the funnel next adjacent to the hood wall having an opening adapted for communication with said opening in the side wall of said hood, a valve-controlled tubular conduit through said side wall opening and communicating between said funnel opening and the conduit to the defroster outlet, a valve in said last mentioned valve-controlled conduit, and means for controlling said valve from within the driver's compartment of the automobile.

6. Ventilating apparatus for automobiles as set forth in claim 5 and in which said funnel has a larger open end forwardly and having a closure wall at a smaller rearward end and in which said side wall opening of the funnel is spaced from the lower wall of the funnel.

7. In an automobile ventilating apparatus as set forth in claim 6, said funnel being wedge shaped and tapered from an open forward end to its closed rear end, and having a drainage opening in its bottom wall adjacent its rear end.

8. In an automobile a ventilating apparatus having the elements of claim 5 and in which the valve controlled tubular conduit is downwardly inclined between the sidewall opening of the funnel and said tubular conduit leading to the defroster outlet.

9. An automobile ventilating device adapted for attachment to an automobile body which has an opening through the wall of a forward compartment and has a defroster air tube extending vertically within said forward compartment with a defroster terminal outlet for air opening within a passenger compartment adjacent to the lower portion of the windshield of the automobile, said ventilating device comprising a section of a ventilating tube member adapted for insertion as a continuous part intermediate the ends of said vertical portion of the defroster tube in adjacently spaced relation to the defroster terminal outlet, said ventilating tube member having a vent opening in its side wall intermediate its ends, an air inlet funnel member adapted for mounting at the exterior of the wall of such front compartment, said funnel having an open forward end and being convergingly tapered from its said open forward end towards its opposite rearward end, the funnel being provided with an opening adjacent its rearward end, a tubular valve-supporting conduit adapted for mounting through the opening of the wall of the forward compartment of the automobile and having its opposite ends connectible in communication between said respective rear end opening of said funnel and said side wall opening of said ventilating tubular member, a control valve in the valve-supporting conduit, and means for operating said valve from the driver's compartment of an automobile.

10. An automobile ventilating device as set forth in claim 9, and in which said funnel is wedge shaped and tapered from an open forward end to the closed rear end, and is provided with a drainage opening in its bottom wall adjacent its rear end.

References Cited by the Examiner

UNITED STATES PATENTS

| | | | |
|---|---|---|---|
| 1,788,205 | 1/1931 | Robinson. | |
| 1,982,591 | 11/1934 | Davis | 98—2.6 |
| 2,864,299 | 12/1958 | Betts | 98—2.1 |
| 3,096,938 | 7/1963 | Cole | 62—244 X |

MEYER PERLIN, *Primary Examiner.*